United States Patent [19]

Aidlin et al.

[11] 4,082,177
[45] Apr. 4, 1978

[54] CONTAINER CONVEYING APPARATUS

[76] Inventors: Samuel S. Aidlin, 214 Beaumont St., Brooklyn, N.Y. 11235; Stephen H. Aidlin, 934 Glenwood Rd., West Hempstead, N.Y. 11581

[21] Appl. No.: 734,650

[22] Filed: Oct. 21, 1976

[51] Int. Cl.[2] ............................................. B65G 47/12
[52] U.S. Cl. ................................... 198/453; 198/443; 198/623; 198/626
[58] Field of Search ............... 198/398, 399, 400, 443, 198/453, 455, 623, 626, 954, 597

[56] References Cited

U.S. PATENT DOCUMENTS

| | | | |
|---|---|---|---|
| 1,416,763 | 5/1922 | Thom | 198/455 X |
| 1,451,450 | 4/1923 | Smith | 198/443 X |
| 3,386,557 | 6/1968 | Ross et al. | 198/443 X |
| 3,386,559 | 6/1968 | Ross et al. | 198/398 |
| 3,463,296 | 8/1969 | Eisen | 198/954 X |
| 3,624,773 | 11/1971 | Krooss | 198/397 |
| 3,669,240 | 6/1972 | Ross | 198/398 |

*Primary Examiner*—John J. Love
*Assistant Examiner*—James L. Rowland
*Attorney, Agent, or Firm*—Martin Smolowitz

[57] ABSTRACT

A conveying apparatus employing a cleated endless conveyor belt to receive and convey plastic containers on to an orientation apparatus provided with like cleated endless conveyor belt, moving in synchronism with the conveying apparatus. A pair of rotatable brushes positioned along and above the conveying apparatus causes containers to individually and separately lodge within the spaces between the cleats as they advance in a forward direction along the endless conveyor belt. A cross belt disposed along the downward travel of the conveyor belt engages the containers and moves them in a lateral direction within the spaces between the cleats until container engagement with an abutment at the edge of the conveyor belt. After traveling through a prescribed course on the conveyor apparatus belt, the respective containers are individually discharged through a passage in the conveyor apparatus on to respective spaces on the advancing orientation apparatus belt cleats.

An alternate embodiment employs a diagonally positioned rotatable brush instead of the pair of brushes; this brush serves to laterally position the containers in the spaces between the cleats.

22 Claims, 6 Drawing Figures

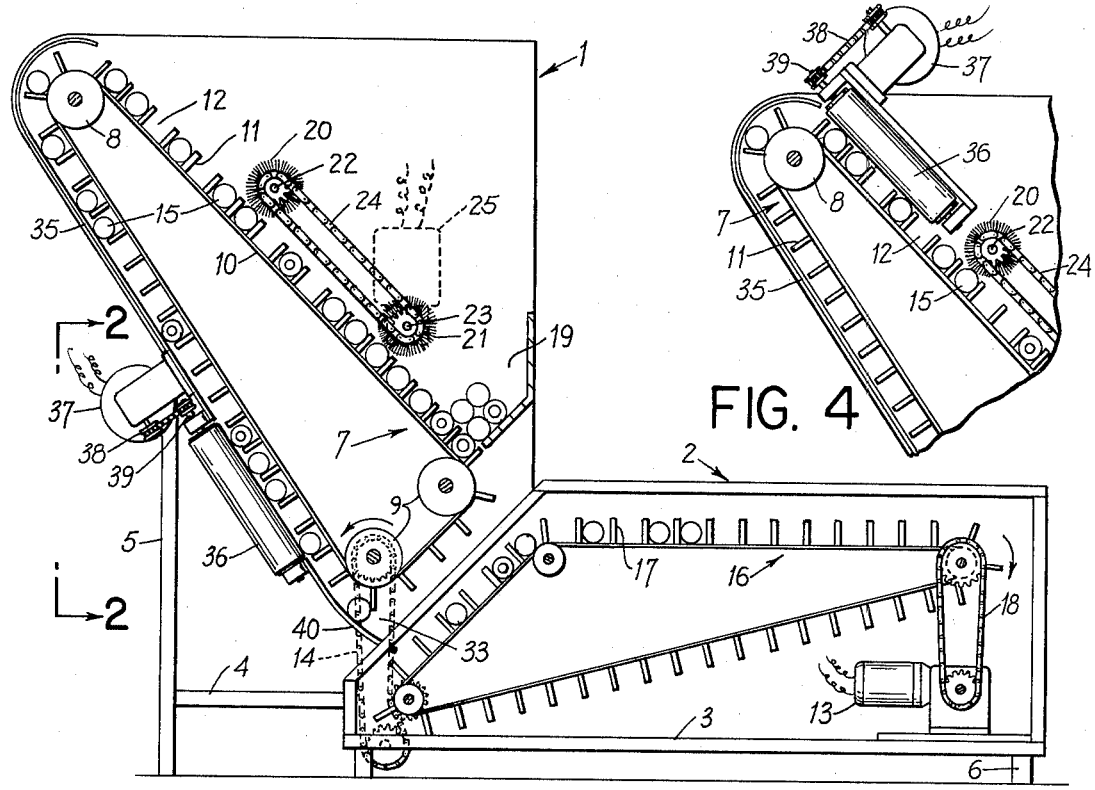
FIG. 4
FIG. 1
FIG. 2
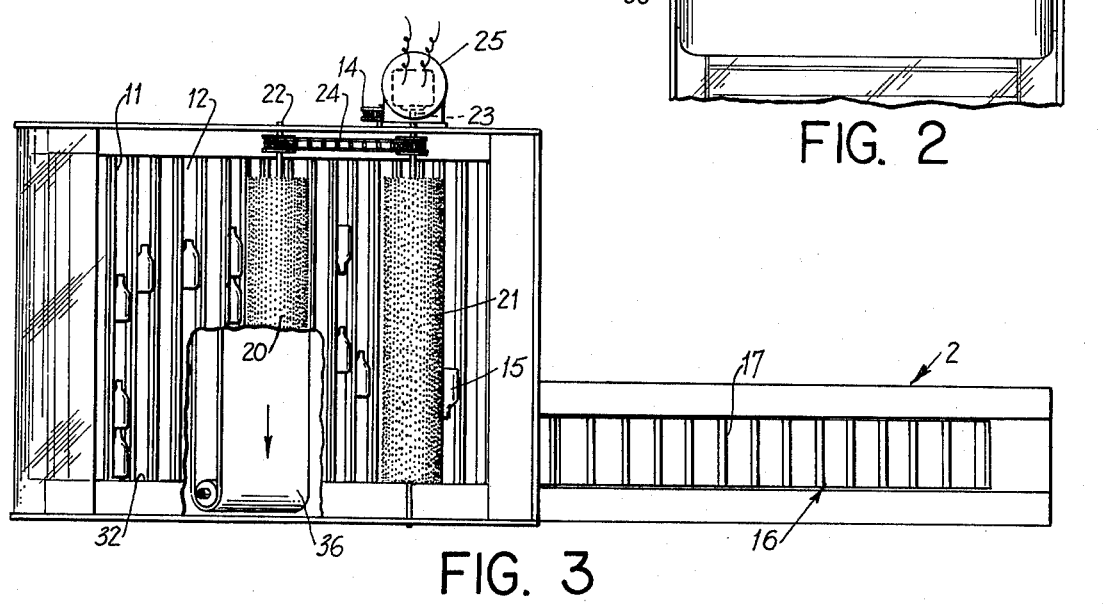
FIG. 3

CONTAINER CONVEYING APPARATUS

The present invention is directed to a container conveying apparatus. More particularly, the invention is directed to an apparatus for receiving and conveying plastic containers in a horizontal position onto an orientation apparatus moving in synchronism with the container conveying apparatus.

It is quite well established that containers as they are placed on stream are initially introduced in a random fashion into a hopper and then advanced by gravity means or a carousel type conveying apparatus for subsequent positioning in the vertical direction to enable the containers to be filled further downstream. A number of shortcomings exist with the prior art, including: the speed of operation, complexity of equipment, expenditure and overall efficiency. For an example, with prior art equipment which employs a carousel arrangement, there is a lessening in the rate of container travel due to the use of a plurality of complex moving elements which require close synchronization in order for the containers to be correctly disposed between appropriate cleats on an advancing conveyor. The room for failure due to container jam-ups, especially at the upper range in the rate of travel, clearly serves as a drawback in using this type of system. In another approach employing a circular rotating hopper and associated chute, the rate of container travel is not always optimized, since the ability to continuously feed in the forward direction is determined by the rate of travel out of the hopper down the gravity inclined chute, and this is limited by the type of containers being handled.

Accordingly, it is the main object of the present invention to overcome the defects of the prior art.

Another object of the present invention is to provide a container conveying apparatus which positions the containers for positive placement upon the associated orientation apparatus.

Still another object of the present invention is to provide an efficient and high speed conveying apparatus employing few operating parts serving to act upon the containers as they advance in a random fashion from an associated source of supply.

Still a further object of the present invention is to provide a container conveying apparatus which serves to position randomly received containers upon an associated orientation apparatus conveyor belt moving at a rate of travel consistent with that of the container conveyor belt.

By means of the present invention, in a very simple and efficient manner, it is possible to convey almost any geometrically shaped plastic container or tube, other than those that tend to shingle or telescope respectively, and position same on an elevated conveyor belt for subsequent placement upon an orientation apparatus positioned in proximity thereto.

The principal features of the present invention are directed to an apparatus for conveying and positioning plastic containers as received in a random fashion, to a point for subsequent placement on to an associated container orientation apparatus, including: a frame; container conveying means mounted on said frame extending upwardly and being provided with a rotatable endless conveyor belt adapted to initially travel upwardly in a forward direction and then proceed downwardly toward a point of origin; receptacle means disposed in proximity to said conveyor belt at said point of origin, for receiving containers to be advanced on said conveyor belt; said conveyor belt being formed by web means along its entire length, having a plurality of traversely spaced cleats mounted thereon, defining spaces for receiving said containers for travel along said conveyor belt; abutment means disposed in close proximity to the side edges of said conveyor belt and extending in a longitudinal direction with respect to said conveyor belt; first rotatable guide means positionable on said frame, disposed above the line of travel of said belt to clear said advancing cleats, said guide means being adapted to direct individual containers within the respective cleat spaces and control movement of said containers during forward advancement on said conveyor belt; positioning means mounted to said frame in spaced relation to said conveyor belt, for maintaining the position of said respective containers within said spaces between said cleats during downward advancement on said conveyor belt; second rotatable guide means transversely mounted with respect to the line of travel to said conveyor belt for urging said containers to move in a lateral direction within each of said cleats until container engagement with said abutment means; and container discharge means formed at the lower portion of said frame at a point proximate to said conveyor belt point of origin, for discharging each of said advancing containers positioned against said abutment means being conveyed by said conveyor belt.

A further feature of the present invention employs a diagonally disposed brush across the forward moving conveyor belt for urging the respective containers to move laterally within the spaces between the respective cleats until said containers engage an abutment along the edge of the conveyor belt.

The foregoing and other objects and advantages of the present invention will become more readily apparent to those skilled in the art from the appended drawings and foregoing description.

IN THE DRAWINGS

FIG. 1 is a partial sectional side view of the preferred embodiment of the invention for use with a bottle orientation apparatus.

FIG. 2 is a view taken along line 2—2 of FIG. 1.

FIG. 3 is plan view of the preferred embodiment of the invention.

FIG. 4 is partial sectional view of the cross belt at a position other than shown in FIG. 1.

Figure 5:
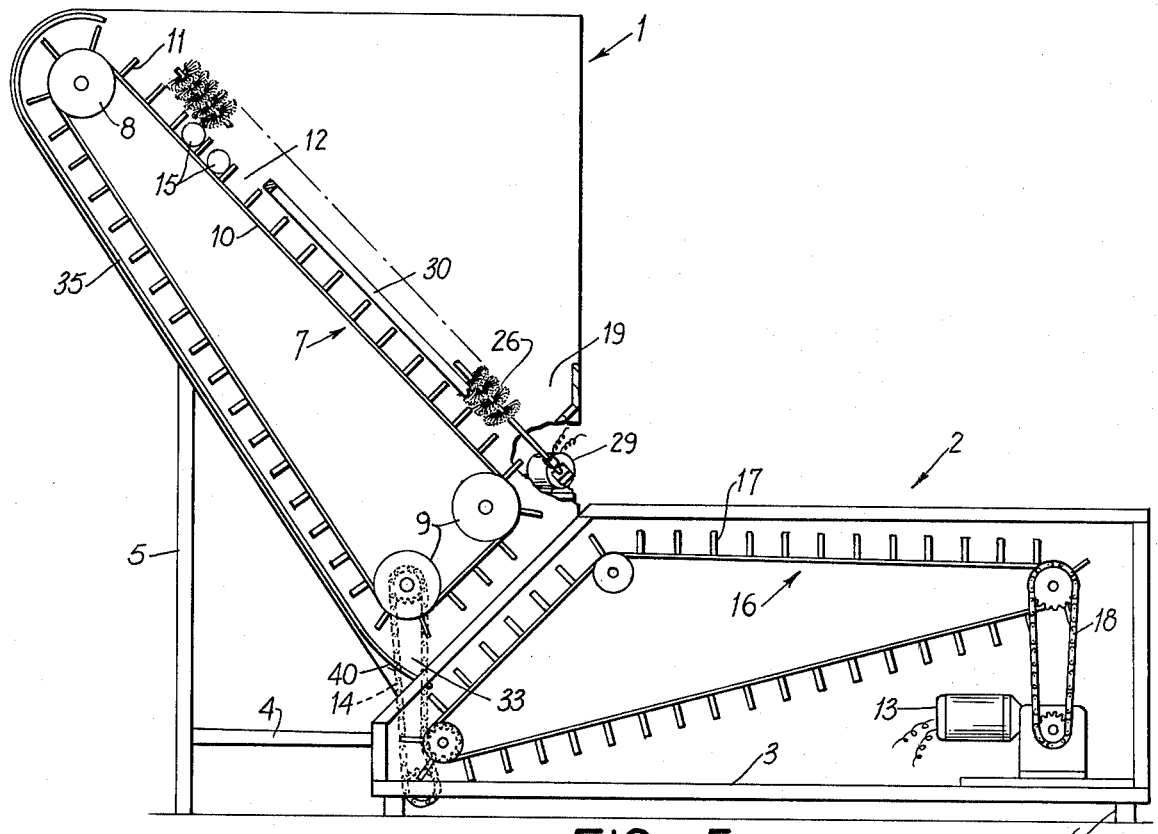
FIG. 5 is partial sectional side view of an alternate embodiment of the invention for use with a bottle orientation apparatus.

According to FIG. 1, the preferred embodiment of the present invention, a container feeding apparatus 1 is employed for use in cooperation with an associated container orientation apparatus 2. The container feeding apparatus 1 includes a supporting frame 3 having horizontally disposed frame members 4 and upwardly extending frame section 5 extending from one end of the frame 3. The frame section 5 is supported on uprights 6 at one end of the frame section. An endless conveyor belt 7 is mounted over drums 8 and 9 affixed to frame section 5. The conveyor belt 7 comprises a web 10 provided along its entire length with transversely disposed regularly spaced cleats 11 at its outer surface; the cleats defining spaces 12 therebetween. The conveyor belt 7 is driven by a motor 13 through a chain and sprocket arrangement 14. Conveyor belt speed is adjustable for governing the delivery rate of containers 15. For example, if it is desired to have 400 containers delivered per minute, the belt 7 would travel at about 3200 inches per minute for a 6 inch diameter container. The distance between adjacent cleats 11 in the above example, is about 8 inches. The container orientation apparatus 2 is also provided with an endless belt 16 with cleats 17 driven through a chain and sprocket mechanism 18 in synchronism with belt 7. The respective cleats 11 of belt 7 and 17 of belt 16 are each equally spaced apart for reasons to be explained hereinafter. Conveyor belt 7 is elevated and extends upwardly at an angle of about 45° with the horizontal and rotates in a counter clockwise direction, whereby it first travels in an upward forward direction and then returns downwardly in a parallel path to retrace its original line of travel. The conveyor belt 7 has a trough like receptacle 19 at the lower front portion, whereby plastic containers 15 positioned in a random fashion, come under the influence of belt 7 and are initially caused to travel in an upward direction along an elevated path.

A pair of brushes 30, 21 shown in FIG. 3 are made of a non-abrasive material, for example, nylon, and are rotatably mounted through shafts 22, 23 to frame section 5 and are driven in synchronism through chain 24 by motor 25. These brushes are disposed above conveyor belts 7 in parallelism with respect to one another and with respect to the cleats 11. The brushes are caused to rotate as the conveyor belt 7 advances with containers 15 in the forward direction. The function of brushes 20, 21 is to prevent advancing containers 15 from overlapping one another or doubling into the spaces between respective cleats 11. In addition, the brushes 20, 21 serve to control the containers 15 from randomly flying off. As shown in FIG. 1, the containers 15 are engaged by rotating brushes 20, 21 in a manner enabling improperly positioned containers to fall back into receptacle 19 and start out again along conveyor belt 7. Brushes 20, 21 rotate at a higher speed than the conveyor belt linear travel speed.

By this particular arrangement, brushes 20, 21 primarily serve to dislodge and correct improperly positioned containers 15 advancing between spaces 12 of cleats 11 on conveyor belt 7.

Figure 6:
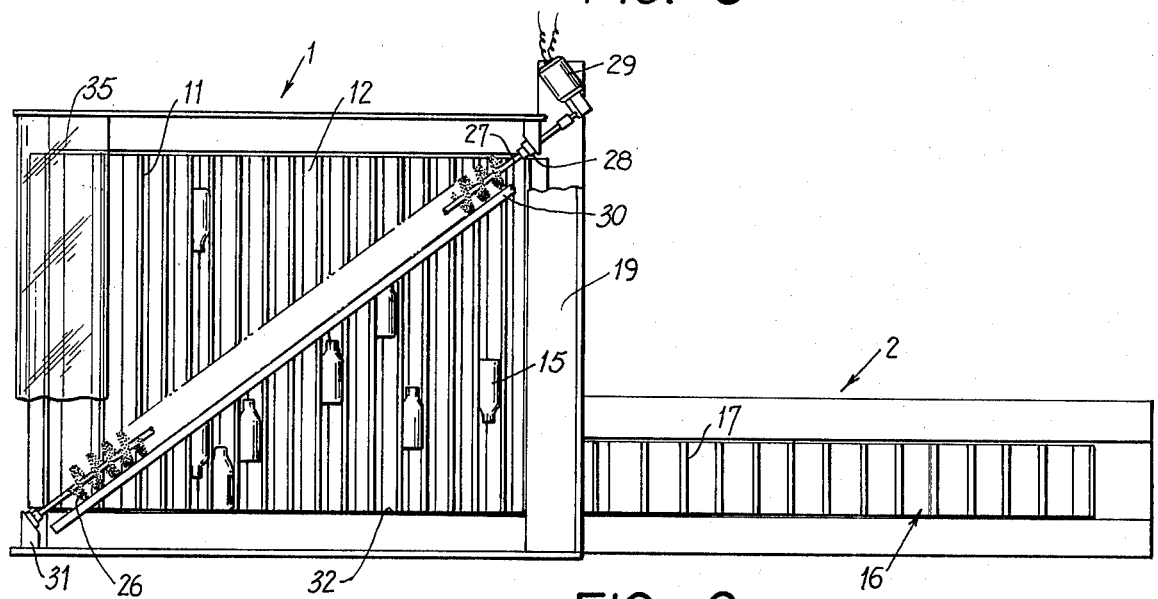
FIG. 6 is a plan view of the invention as shown in FIG. 5.

An alternate embodiment to the aforementioned is shown in FIGS. 5 and 6. This arrangement contemplates the use of a single brush 26 diagonally positioned with respect to the conveyor belt 7, serving to properly orient the advancing containers 15 within their respective positions in the spaces 12 between cleats 11. According to this embodiment, brush 26 which may be either spiral or cylindrical in shape, is made of a non-abrasive material, for example, nylon, and is rotatably mounted on frame section 5 through shaft 27 journalled to bearings 28 and is driven by motor 29 along a diagonal line of action above the path of conveyor belt 7. In addition, a guide bar 30 (see FIG. 6) disposed in proximity to and in parallelism with brush 26, serves to cooperate with brush 26 during the movement of containers 15 along upward travel of conveyor belt 7. Both brush 26 and guide bar 30 are disposed to clear rotatable conveyor belt 7. The guide bar 30 is adjustably attached at opposite ends to the frame section 5 and mounting brackets 31 are provided with suitable means, i.e., slots, enabling vertical adjustment of brush 26 in accordance with different diameters or thicknesses of containers 15 that are being conveyed on belt 7. Adjustment of brush 26 is also necessary from time to time due to wear. During movement of the containers 15 on the conveyor belt 7 out of receptacle 19, the brush 26 which is positioned below the outside diameter of the containers 15, continuously rotates in a clockwise direction at about 120 rpm and serves to impinge upon and urge the containers 15 to move laterally within the spaces 12 of cleats 11, until either the neck or base portion of the respective containers 15 are each respectively positioned to the extreme left hand edge of the belt 7 against abutment 32. As illustrated in FIG. 6, the longitudinally extending abutment 32 is provided in close proximity to side edges of cleats 11, having its lower edges close to the web 10. Abutment 32 may be supported at the frame section 5 in any desired manner. Once positioned against the abutment 32, the containers 15 proceed to travel within the spaces 12 of respective cleats 11 always resting by gravity action against the lower cleat of any given pair of cleats.

The guide bar 30 in conjunction with brush 20 functions to control the upward movement of the containers 15 as they advance under the action of the brush 26 and prevents tipping of the containers as they laterally move within the spaces 12 toward abutment 32.

Once the containers 15 proceed to travel downwardly on the conveyor belt 7 toward the point of origin, they continue to rest against each of the same lower cleats (of any given pair of cleats) as defined by the initial position attained during upward movement on the conveyor belt 7. An external cover 35 attached to frame section 5 encloses the underside of the conveyor belt 7 and is sufficiently spaced with respect to the conveyor belt 7, to enable the downwardly moving containers 15 to remain in position as they travel toward the container orientation apparatus 2. The cover 35 is partially constructed of a clear material, such as Plexiglass, for a substantial portion of its length, to enable the operator to monitor the action and movement of containers 15.

Brushes 20, 21 as described above, act upon containers 15 differently than diagonally positioned brush 26. Specifically, brushes 20, 21 are intended to cooperate with endless cross belt 26, shown in FIG. 1, disposed between sections of external cover 35 and in direct communication with containers 15 moving downwardly between spaces 12 of cleats 11. The cross belt 36 (see FIG. 2) is rotatably mounted on to frame section 5 through shaft 39 and is driven by a motor 37 through chain 38 and extends transversely across the entire width of the conveyor belt 7. By acting transverse to the line of travel of belt 7, rotating cross belt 36 is caused to impinge upon the surfaces of the respective containers 15, providing continuous lateral movement of the respective containers 15 in the spaces 12 between the cleats 11, until abutment 32 is engaged by one end of the containers 15.

As positioned along external cover 35, shown in FIGS. 1 and 2, the cross belt 36 is mounted to the frame section 5 above and out of contact with cleats 11 of conveyor belt 7, however, due to gravity action, the containers 15 tend to move away from the belt 7 and contact is made with rotating cross belt 36 causing the necessary lateral movement to the advancing containers 15.

Cross belt 36 is designed to create a frictional force with respect to containers 15 in excess of that existing between the conveyor belt 7 and containers 15; as a result the contact force imparted by belt 36 is sufficient to urge lateral movement of the containers 15 along the spaces 12 between cleats 11.

The rate of travel of cross belt 36 is proportional to the speed of travel of the conveyor belt 7 and is constructed of a material having a greater co-efficient of friction than that of conveyor belt 7. The width of cross belt 36 is proportional to and is a function of the container feed rate, and the type and shape of container being handled.

FIG. 4 shows an alternative placement of cross belt 36 with respect to conveyor belt 7, at a point along the forward travel of and above the belt 7 beyond the brush 20. Here too, the cross belt 36 is rotatable transverse to the conveyor belt 7 being mounted on a frame support and driven in a similar fashion to cross belt 36 at cover 35 shown in FIG. 1. The cross belt 36 is disposed at a height sufficient to tangentially contact the advancing containers 15 in spaces 12 to thereby impart lateral motion to the containers 15 of a magnitude sufficient to urge movement of containers 19 toward abutment 32. Thereafter, the containers 15 proceed along conveyor belt 7 in their usual fashion.

The lower-most portion of the supporting frame 3, see FIGS. 1 and 5, is provided with an adjustable opening 33 which is disposed in alignment with and in proximity to the belt 16 of the orientation apparatus 2. The opening 33 serves to enable the containers 15 to pass therethrough by gravity, into respective spaces formed between cleats 17. Opening 33 is adjustable by positionable shutters 40. Sufficient clearance exists at the opening for one container length to pass and adjustment enables different heights of containers 15 to be deposited therethrough.

Since the speed of travel of the conveyor belt 7 is linked to the container orientation apparatus belt 16 and the respective spaces between cleats 11 and 17 are identical, synchronism is always attained and positive positioning of containers from the feeding apparatus 1 to the orientation apparatus 2 is assured. If during a given operation, several containers 15 rest along the same space 12 defined by a pair of cleats of belt 7, i.e., end to end, etc., this situation is simply corrected. Since only containers 15 in a most extreme position against abutment 32 are allowed to pass through the opening 33, any additional containers in the same space 12 on belt 7 continue to travel upwardly on belt 7 to repeat the cycle, for lateral movement against the abutment 32. Thereafter, the containers 15 proceed to travel downwardly through the opening 33 in a normal fashion.

With the present invention, it is possible to handle as many as 400 containers per minute and since the spaces 12 between the cleats 11 can be fixed for a maximum anticipated diameter of containers, even though a given run may be of a smaller diameter, the particular invention exhibits a high degree of versatility for allowing different sized containers to be handled without the need for adjustment or replacement of the cleated belts. The above situation is due to the fact that the conveyor belt 7 is disposed at an incline to the horizontal, thus causing the containers 15 to nestle against the lower-most cleat of a given pair, thereby providing ample clearance therebetween.

Another advantage of the present invention resides in the ability to employ an orientation apparatus 2 of a size that is smaller than normal, since such apparatus is disposed in proximity to and partially beneath the container feeding apparatus 1, to enable the adjustable opening 33 to be in alignment with the cleated belt 7 with discharge of containers 15 taking place above the point of entry of belt 16 of apparatus 2.

It will be apparent to those skilled in the art from the preceding description, that certain changes may be made in the above invention without departing from the scope of the invention. It is intended that the descriptive matter above shall be interpreted as illustrative and in no way limiting, since all equivalents within the scope of the disclosure may be substituted and such substitution is intended.

What we claim:

1. An apparatus for conveying and positioning plastic containers as received in a random fashion, to a point for subsequent placement on to an associated container orientation apparatus, including: a frame; container conveying means mounted on said frame extending upwardly and being provided with a rotatable endless conveyor belt adapted to initially travel upwardly in a forward direction and then proceed downwardly toward a point of origin; receptacle means disposed in proximity to said conveyor belt at said point of origin, for receiving containers to be advanced on said conveyor belt; said conveyor belt being formed by web means along its entire length, having a plurality of traversely spaced cleats mounted thereon, defining spaces for receiving said containers for travel along said conveyor belt; abutment means disposed in close proximity to the side edges of said cleats and extending in a longitudinal direction on one side of said conveyor belt; first rotatable guide means mounted on said frame, disposed above the line of travel of said belt to clear said advancing cleats, said guide means being adapted to direct individual containers within the respective cleat spaces and control movement of said containers during forward advancement on said conveyor belt; positioning means mounted to said frame in spaced relation to said conveyor belt, for maintaining the position of said respective containers within said spaces between said cleats during downward advancement on said conveyor belt; second rotatable guide means transversely mounted with respect to the line of travel to said conveyor belt for urging said containers to move in a lateral direction within each of said cleats until container engagement with said abutment means; and container discharge means formed at the lower portion of said frame at a point proximate to said conveyor belt point of origin, for discharging each of said advancing containers positioned against said abutment means being conveyed by said conveyor belt.

2. An apparatus as claimed in claim 1, wherein: said first guide means comprises, a pair of rotatably mounted brushes disposed in spaced relation above the line of forward travel of said conveyor belt, and being adapted to engage said advancing containers traveling in a forward direction on said conveyor belt.

3. An apparatus as claimed in claim 2, wherein: each of said brushes comprising said first guide means being mounted in parallelism with respect to said conveyor belt cleats for engaging advancing containers traveling in a forward direction within said spaces formed by adjacent cleats.

4. An apparatus as claimed in claim 1, wherein: said first guide means rotates at a rate of speed greater than said conveyor belt linear travel.

5. An apparatus as claimed in claim 1, wherein: said second guide means being disposed between portions of said positioning means, for longitudinally engaging said containers advancing between said cleats, to thereby urge controlled lateral movement of said containers toward said abutment means.

6. An apparatus as claimed in claim 1, wherein: said second guide means being disposed above said conveyor belt at a point along the forward travel of said belt and beyond said rotatable first guide means.

7. An apparatus as claimed in claim 1, wherein: said second guide means being an endless belt transversely disposed to the line of travel of said conveyor belt.

8. An apparatus as claimed in claim 1, wherein: said second guide means being rotatable at a rate of travel proportional to the rate of travel of said conveyor belt.

9. An apparatus as claimed in claim 1, wherein: said second guide means being defined by a material having a greater co-efficient of friction than said conveyor belt.

10. An apparatus for conveying and positioning plastic containers as received in a random fashion, to a point for subsequent placement on to an associated container orientation apparatus, including: a frame; container conveying means mounted on said frame extending upwardly and being provided with a rotatable endless conveyor belt adapted to initially travel upwardly in a forward direction and then proceed downwardly toward a point of origin; receptacle means disposed in proximity to said conveyor belt at said point of origin, for receiving containers to be advanced on said conveyor belt; said conveyor belt being formed by web means along its entire length, having a plurality of traversely spaced cleats mounted thereon, defining spaces for receiving said containers for travel along said conveyor belt; abutment means disposed in close proximity to the side edges of said cleats and extending in a longitudinal direction on one side of said conveyor belt; rotatable guide means positionable on said frame, disposed above the line of travel of said belt to clear said advancing cleats, for positively urging said containers to move in a lateral direction within the spaces between each of said cleats enabling container engagement with said abutment means; restraining means disposed in proximate relationship to said guide means and in parallel relation therewith, for restraining uncontrolled movement of said containers during engagement of said containers by said guide means; positioning means mounted to said frame in spaced relation to said conveyor belt, for maintaining the position of said respective containers within said spaces between said cleats during advancement on said conveyor belt in the downward direction; and container discharge means formed at the lower portion of said frame at a point proximate to said conveyor belt point of origin for discharging each of said advancing containers positioned against said abutment means being conveyed by said conveyor belt.

11. An apparatus as claimed in claim 10, wherein: said rotatable guide means being diagonally disposed along the line of forward travel of said conveyor belt and adapted to engage a portion of said advancing containers traveling in a forward direction on said conveyor belt.

12. An apparatus as claimed in claim 10, wherein: said rotatable guide means being defined by a spiral shaped brush rotatably mounted at a diagonal with respect to said conveyor belt extending for the length of said belt, and being adapted to impinge upon said containers, thereby causing controlled container movement in a lateral direction within the respective slots formed of said cleats, as said containers are conveyed in a forward direction.

13. An apparatus as claimed in claim 10, wherein: said rotatable guide means being defined by a cylindrically shaped brush rotatably mounted at a diagonal with respect to said conveyor belt extending for the length of said belt, and being adapted to impinge upon said containers, thereby causing controlled container movement in a lateral direction within the respective slots formed of said cleats, as said containers are conveyed in a forward direction.

14. An apparatus as claimed in claim 10, wherein: said rotatable guide means being provided with adjustment means for adjustment in a vertical direction with respect to said conveyor belt.

15. An apparatus as claimed in claim 10, wherein: said rotatable guide means being adapted to continuously engage said containers for lateral movement within respective slots formed of said cleats until said containers engage said abutment means disposed at the edge portion of said conveyor belt.

16. An apparatus as claimed in claim 10, wherein: said rotatable guide means rotates at a rate of speed less than said conveyor belt.

17. An apparatus as claimed in claim 1, wherein: said container discharge means being provided with shutter means for adjusting the opening formed at the lower portion of said frame.

18. An apparatus as claimed in claim 1, wherein: said associated container orientation apparatus being provided with an endless rotatable conveyor belt means having spaced cleats and being disposed at a point below said discharge means for successively receiving containers passing through said discharge means into respective spaces formed between said cleats on said container orientation conveyor belt.

19. An apparatus as claimed in claim 18, wherein: said respective conveyor belts of said conveying and positioning apparatus and said orientation apparatus rotate in synchronism with respect to one another at the same rate of travel.

20. An apparatus as claimed in claim 19, wherein: the respective spaces between cleats on each of said belts is identical.

21. An apparatus as claimed in claim 19, wherein: said respective conveyor belts being driven through common drive means.

22. An apparatus as claimed in claim 10, wherein: said rotatable guide means being driven by motor means in a clockwise direction at a first speed sufficient to contact said advancing containers traveling at a second speed on said conveyor belts whereby, said guide means along its entire length, imparts a tangential force upon points of contact with said containers sufficient to cause progressive lateral movement within said respective slots formed of said cleats.

* * * * *